March 17, 1925.
S. BÉLAKÖY
GARDENING IMPLEMENT
Filed Jan. 10, 1924
1,530,225
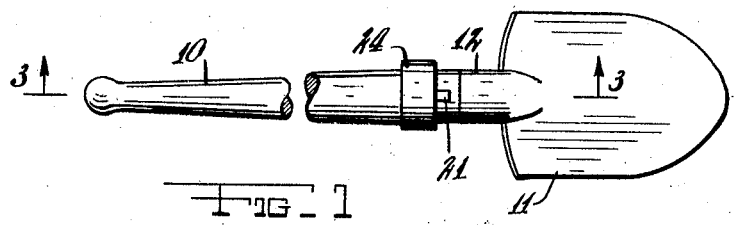
FIG. 1
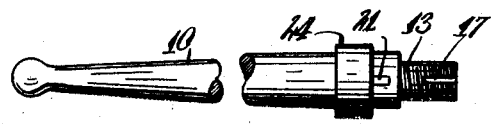
FIG. 2
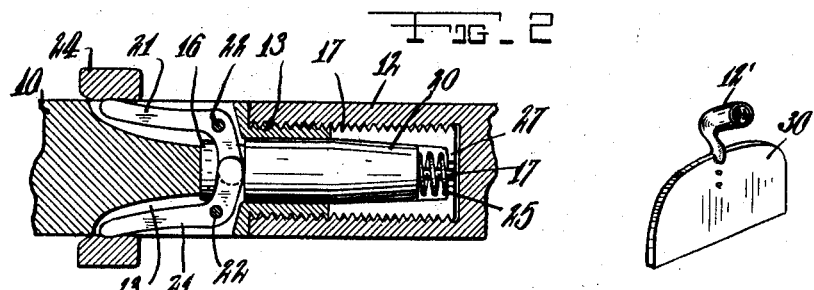
FIG. 3
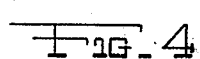
FIG. 4
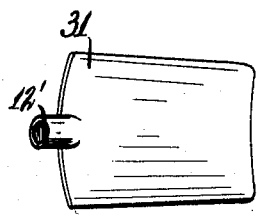
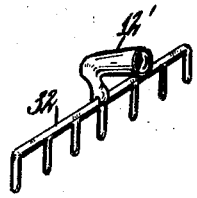
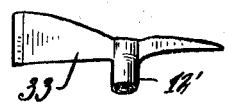
FIG. 5  FIG. 6  FIG. 7
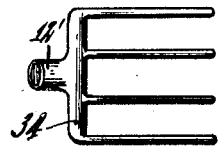
FIG. 8
INVENTOR
Steven Bélaköy
BY
ATTORNEY Patented Mar. 17, 1925.

1,530,225

UNITED STATES PATENT OFFICE.

STEVEN BÉLAKÖY, OF DETROIT, MICHIGAN.

GARDENING IMPLEMENT.

Application filed January 10, 1924. Serial No. 685,336.

*To all whom it may concern:*

Be it known that I, STEVEN BÉLAKÖY, citizen of the Republic of Hungary, residing at Detroit, in the county of Wayne and State of Michigan, have invented certain new and useful Improvements in Gardening Implements, of which the following is a specification.

This invention relates generally to gardening implements, having more particular reference to a construction which permits of a common handle being utilized for a number of implements, the invention having for an object the provision of a novel form of means for detachably securing the handle to the head of the implement.

For further comprehension of the invention, and of the objects and advantages thereof, reference will be had to the following description and accompanying drawing, and to the appended claims in which the various novel features of the invention are more particularly set forth.

Fig. 1 of the drawing is a face view showing one form of my improved implement.

Fig. 2 is a detail side elevational view of the handle.

Fig. 3 is an enlarged fragmentary longitudinal sectional view taken on the line 3—3 of Fig. 1, and illustrating the means for locking the handle to the head of the implement.

Figs. 4 to 8 are detail views showing different implement heads to which the one handle may be attached.

Referring now to the drawing, the reference numeral 10 indicates an elongated handle such as is suitable for gardening implements and which is adapted to be removably attached to any one of a number of implement heads, the handle being shown in Fig. 1 is attached to a spade 11. To attach the handle to the implement head the latter is formed with a socket element 12 at its upper end which is internally screw-threaded, while the handle is formed on its lower end with a thread extension 13 which is adapted to be screwed into said socket, the two parts 12 and 13 being preferably arranged to permit of easy screwing of the handle onto the head, means being provided whereby the extension is locked in the socket, which means can be readily manipulated without the aid of a special tool.

As here shown the extension 13 is formed with an internal bore 16 which is entered from the end thereof and which is tapered inwardly at its outer end, while a number of slots 17 are formed in the wall of this bore which extends longitudinally from the end of the said extension, it being apparent that expanding movement of the extension 13 is thus permitted. Slidable in the bore 16 is a plug 20 which may have its forward end tapered in correspondence to the taper of the bore, and which is adapted to be moved longitudinally to expand the said extension by means of a pair of bell crank levers 21 which are fulcrumed as at 22 in recesses 23 in the handle and which bear at one end on the rear end of the said plug, the other ends of these levers being adapted to be engaged by a collar 24 slidable on the handle and which by pressing the said lever ends toward one another causes the other end of the levers to bear on the plug and force the latter forwardly, this plug being moved rearwardly by means of a coiled expansion spring 25 located in the front end of the bore 16 and bearing at opposite ends respectively on the plug 20 and an inturned flange 27 at the front end of the bore 16.

In Figs. 4, 5, 6, 7 and 8 I have indicated respectively a hoe 30, a shovel 31, a rake 32, a combination hatchet and pick 33, and a fork 34, arranged with socket members such as 12′ to receive the improved handle element which I have here shown.

Having thus described my invention what I claim as new and desire to protect by Letters Patent of the United States is as follows:

1. An implement of the class described comprising a head, a screw socket on said head, a handle having a threaded end engaging in said socket, and means for expanding said end to lock the handle to the socket, said means including a plug slidable longitudinally in the said handle end, a bell crank lever fulcrumed in said handle, said lever having one arm extending transversely to the handle and adapted to bear on one end of said plug, the other arm of said lever extending approximately longitudinally of the handle and a collar slidable on the handle and adapted to bear on said last named arm to operate said lever.

2. An implement of the class described comprising a head, a screw socket on said head, a handle having a threaded end engaging in said socket, and means for expanding said end to lock the handle to the socket, said means including a plug slidable longitudinally in the said handle end, a lever fulcrumed in said handle and adapted to bear on one end of said plug, a collar slidable on the handle and adapted to operate said lever, and a spring bearing on the other end of the said plug to move it in an opposite direction.

In testimony whereof I have affixed my signature.

STEVEN BÉLAKÖY.